US010646827B2

(12) United States Patent
Umbarkar et al.

(10) Patent No.: US 10,646,827 B2
(45) Date of Patent: May 12, 2020

(54) NON NOBLE METAL BASED DIESEL OXIDATION CATALYST

(71) Applicant: Council of Scientific & Industrial Research, New Delhi (IN)

(72) Inventors: Shubhangi B. Umbarkar, Pune (IN); Mohan K. Dongare, Pune (IN); Pavan M. More, Pune (IN); Ankush V. Biradar, Pune (IN)

(73) Assignee: Council of Scientific & Industrial Research, New Delhi (IN)

( * ) Notice: Subject to any disclaimer, the term of this patent is extended or adjusted under 35 U.S.C. 154(b) by 44 days.

(21) Appl. No.: 15/112,986

(22) PCT Filed: Jan. 21, 2015

(86) PCT No.: PCT/IN2015/000039
§ 371 (c)(1),
(2) Date: Jul. 20, 2016

(87) PCT Pub. No.: WO2015/111079
PCT Pub. Date: Jul. 30, 2015

(65) Prior Publication Data
US 2016/0332118 A1    Nov. 17, 2016

(30) Foreign Application Priority Data

Jan. 21, 2014  (IN) .............................. 186/DEL/2014

(51) Int. Cl.
*B01D 53/94* (2006.01)
*B01J 23/34* (2006.01)
(Continued)

(52) U.S. Cl.
CPC ......... *B01D 53/945* (2013.01); *B01D 53/944* (2013.01); *B01D 53/9495* (2013.01);
(Continued)

(58) Field of Classification Search
CPC ............... B01D 53/945; B01D 53/944; B01D 53/9495; B01J 23/002; B01J 23/34;
(Continued)

(56) References Cited

U.S. PATENT DOCUMENTS 5,491,120 A    2/1996 Voss et al.
5,976,476 A    11/1999 Blanchard et al.
(Continued)

FOREIGN PATENT DOCUMENTS

EP         0432534 A1    6/1991
WO    WO-97/10892 A1    3/1997
(Continued)

OTHER PUBLICATIONS

Liberman et al (Synthesis and Catalytic Properties of Nanostructured Me/Mn0.5Ce0.5O2 in the Oxidation of Carbon Monoxide Catalysis in Industry, 2012, vol. 4. No. 3, pp. 186-190).*
(Continued)

*Primary Examiner* — Melvin C. Mayes
*Assistant Examiner* — Michael Forrest
(74) *Attorney, Agent, or Firm* — Locke Lord LLP; Nicholas J. DiCeglie, Jr.

(57) ABSTRACT

Disclosed is a cheap and efficient non noble metal based catalyst for the oxidation of diesel or hydrocarbons, its synthesis and its application for diesel oxidation at low temperature. The catalyst comprises a mixed oxide of manganese and cerium, or manganese, cerium and zirconium. The catalyst has improved water and sulphur tolerance.

7 Claims, 16 Drawing Sheets

(51) Int. Cl.
 B01J 35/10 (2006.01)
 B01J 35/02 (2006.01)
 B01J 37/10 (2006.01)
 B01J 37/03 (2006.01)
 B01J 23/00 (2006.01)
 B01J 35/00 (2006.01)
 B01J 37/00 (2006.01)
 B01J 37/04 (2006.01)
 B01J 37/06 (2006.01)
 B01J 37/08 (2006.01)

(52) U.S. Cl.
 CPC ............ B01J 23/002 (2013.01); B01J 23/34 (2013.01); B01J 35/0013 (2013.01); B01J 35/023 (2013.01); B01J 35/10 (2013.01); B01J 35/1019 (2013.01); B01J 35/1038 (2013.01); B01J 37/009 (2013.01); B01J 37/03 (2013.01); B01J 37/04 (2013.01); B01J 37/06 (2013.01); B01J 37/08 (2013.01); B01J 37/10 (2013.01); B01D 2255/2065 (2013.01); B01D 2255/2073 (2013.01); B01D 2255/20715 (2013.01); B01D 2255/40 (2013.01); B01D 2255/407 (2013.01); B01D 2255/65 (2013.01); B01D 2255/9202 (2013.01); B01D 2255/9205 (2013.01); B01D 2255/9207 (2013.01); B01D 2258/012 (2013.01); B01J 2523/00 (2013.01)

(58) Field of Classification Search
 CPC ...... B01J 35/0013; B01J 35/023; B01J 35/10; B01J 35/1019; B01J 35/1038; B01J 37/009; B01J 37/03; B01J 37/04; B01J 37/06; B01J 37/08; B01J 37/10
 See application file for complete search history.

(56) References Cited

U.S. PATENT DOCUMENTS

| | | | |
|---|---|---|---|
| 6,093,378 | A | 7/2000 | Deeba et al. |
| 6,274,107 | B1 | 8/2001 | Yavuz et al. |
| 7,078,004 | B2 | 7/2006 | Voss et al. |
| 7,517,826 | B2 | 4/2009 | Fujdala et al. |
| 7,534,738 | B2 | 5/2009 | Fujdala et al. |
| 8,057,767 | B1 | 11/2011 | Qi et al. |
| 2008/0124514 | A1 | 5/2008 | Fujdala et al. |
| 2008/0125308 | A1 | 5/2008 | Fujdala et al. |
| 2008/0279738 | A1 | 11/2008 | Strehlau et al. |
| 2010/0105547 | A1 | 4/2010 | Ito et al. |
| 2011/0044871 | A1 | 2/2011 | Maletz et al. |
| 2011/0113774 | A1 | 5/2011 | Nunn et al. |
| 2012/0036834 | A1 | 2/2012 | Qi et al. |
| 2013/0202509 | A1 | 8/2013 | Schuetze et al. |

FOREIGN PATENT DOCUMENTS

| | | |
|---|---|---|
| WO | WO-2008/117941 A1 | 10/2008 |
| WO | WO-2009/074308 A1 | 6/2009 |

OTHER PUBLICATIONS

Liu et al (A comparative study of formaldehyde and carbon monoxide complete oxidation on MnOx—CeO2 catalysts, J Rare Earths, vol. 27, No. 3, (2009), p. 418-424). (Year: 2009).*
Qi et al (MnOx—CeO2 mixed oxides prepared by co-precipitation for selective catalytic reduction of NO with NH3 at low temperatures, Appl Catal B: Environ, 51 (2004) 93-106) (Year: 2004).*
F. Arena et al. "Basic Evidence of the Molecular Dispersion of MnCeO$_x$ Catalysts Synthesized via a Novel "Redox-Precipitation" Route," XP-002666679, Chem. Mater. 19, 2269-2276, (2007).
Qi et al. "MnOx—CeO2 mixed oxides prepared by co-precipitation for selective catalytic reduction of NO with NH$_3$ at low temperatures," Applied Catalysis B: Environmental 51, 93-106, (2004).
X Li et al., "Catalytic combustion of ethyl acetate over CeMnO$_x$ and CeMnZrO$_x$ compounds synthesized by coprecipitation method," Journal of Natural Gas Chemistry 20, 623-628, (2011).
Q. Xhang et al., "A novel catalytic activity of Ce—Zr—Mn—O$_x$ mixed oxides for low temperature selective catalytic reduction of NO with NH$_3$," Advanced Materials Research vols. 864-867, 635-639, (2014).
Y. Liao et al. "Catalytic oxidation of toluene over nanorod-structured Mn—Ce mixed oxides," Catalysis Today 216-220-228, (2013).
N. Drenchev et al. "Cooperative effect of Ce and Mn in MnCe/Al$_2$O$_3$ environmental catalysts," Appl. Catal. B: Env. 138-139, 362-372, (2013).

* cited by examiner

NON NOBLE METAL BASED DIESEL OXIDATION CATALYST

CROSS REFERENCE TO RELATED APPLICATIONS

This application is a 35 U.S.C. § 371 National Phase Application of International PCT Patent Application No. PCT/IN2015/000039, filed Jan. 21, 2015 which application claims the benefit of priority to Indian Patent Application No. 186/DEL/2014, filed Jan. 21, 2014, the contents of each of which are hereby incorporated herein by reference in their entirety.

FIELD OF THE INVENTION

The present invention relates to a process for preparation of mixed metal oxide based diesel oxidation catalyst (DOC) for complete oxidation of hydrocarbons and carbon monoxide from diesel engine exhaust. The catalyst is non-noble metal based.

BACKGROUND OF THE INVENTION

The diesel engine based vehicles have become more popular for both passenger cars as well as for heavy vehicles for transportation and other applications. However, it is well known fact that these engines emit large amount of hydrocarbons (HCs), carbon monoxide, NOx and particulate matter (PM) due to incomplete combustion of fuel and other processes at higher temperature in internal combustion diesel engines. Due to the concern about the environmental pollution and stringent emission regulations, there is a need to control the emission of these pollutants like $NO_x$, CO and unburnt hydrocarbons (HCs). Oxidation catalysts have been used to oxidize CO, HC and NOx to clean up the diesel engine exhaust. Noble metal based catalysts, particularly Pt and Pd supported on alumina have been used as DOC for oxidation of hydrocarbon and CO to $CO_2$ as well as oxidation of NOx to $NO_2$ which is used for the oxidation of particulate matter. Sometimes, the diesel engine exhaust contains large quantity of $SO_2$ due to the higher sulfur content in the diesel fuel, because of which the noble metal based catalysts gets deactivated due to sulfur poisoning. The diesel engine exhaust temperature sometimes exceeds >600° C., particularly for heavy vehicle diesel engine, and then in the Pt, Pd based catalysts where the Pt, Pd, are dispersed on high alumina support, get agglomerated/sintered thus lowering the catalytic activity of the diesel oxidation catalysts.

WO 2009/074308 or EP 2070581 A1 relates to a catalyst containing a carrier and a coating, characterized in that the coating comprises a support material and at least one zeolite, the support material comprising platinum, palladium and at least one promoter selected from the group consisting of Mg, Ca, La, Ti, Zr, Hf, Au, Si, Sn, P compounds or mixtures of these promoters, loaded thereon. The document also relates to a process for the manufacture of the catalyst and the use thereof for the purification of exhaust gases from Diesel and lean Otto engines. The catalyst effectively oxidizes carbon monoxide and hydrocarbons, has a high resistance towards hydrothermal aging and is stable during operation.

EP1925362, US2008/0124514, U.S. Pat. Nos. 7,517,826 and 7,534,738 disclose diesel oxidation catalysts in which there is a mixture of a first and a second catalytically active material. For production of the first catalytically active material, palladium in addition to gold is supported on a lanthanum oxide-stabilized aluminum oxide. As the second catalytically active material, platinum is applied, optionally together with palladium or bismuth, to lanthanum oxide-stabilized aluminum oxide. The two catalytically active materials may be applied to an inert honeycomb as a homogeneous powder mixture in E catalytically active layer or in the form of a plurality of different coatings (for example as a Zone catalyst or layer catalyst). In the case of multilayer catalysts, it is additionally possible for Zeolite containing intermediate layers and/or layers comprising palladium supported on cerium oxide to be present.

WO 2009/106849 and US20110113774 disclose diesel oxidation catalysts whose features include high conversion rates for methane and presence of palladium and gold as active components, preferably in alloyed form. For preparation of the catalysts, palladium ex palladium nitrate and gold ex tetrachloroauric acid are applied by precipitation and calcination to aluminum oxide as the support material. The powder component thus obtained can be used to prepare a suspension for coating of conventional flow honeycombs as the catalyst substrate.

WO 2008/117941 discloses diesel oxidation catalysts which feature improved HC oxidation activity and comprise palladium alloyed with gold on aluminum oxide as the first catalytically active material, in addition to platinum alloyed with palladium on aluminum oxide as the second catalytically active material. Instead of aluminum oxide, it is also possible to use other inorganic support oxides, for example silicon dioxide, aluminum silicate, silicates, titanium oxide, Zirconium oxide, SiC and carbon black. A diesel oxidation catalyst produced from the mixture of the catalytically active materials may further comprise oxygen-storing rare earth metal oxides.

US 2008/125308 describe exhaust gas catalysts which comprises a platinum-containing catalyst and a palladium- and gold-containing catalyst, which may additionally comprise Zeolite as an absorbent for hydrocarbons. The two catalysts are arranged in various catalytically active Zones of the exhaust gas catalyst, in such a way that the exhaust gas encounters the platinum catalyst first. This is achieved by means of customary layer or zone arrangement of the two catalysts, or by virtue of the two catalysts being supported on different monoliths.

Article titled, "Cooperative effect of Ce and Mn in MnCe/$Al_2O_3$ environmental catalysts" by Hadjiivanov et al. in Appl. Catal. B: Env. 2013, 138-139, 362-372 reports a series of alumina supported catalysts containing Ce and Mn with different ratios for methanol decomposition or NO reduction with methanol decomposition products.

U.S. Pat. No. 6,274,107 discloses an oxidation catalyst, which contains cerium oxide, optionally aluminum oxide and a zeolite, for example zeolite beta. The zeolite can be doped with the metals of the platinum group and other metals or metal species, such as Pt, Rh, Pd, Ru, Os, Ir, Cu, Fe, Ni, Cr, and V. The catalyst promotes the oxidation of CO, HC.

EP 0432534B2 and US 20080279738 disclose a continuously working oxidation catalyst having high conversion performance for hydrocarbons and carbon monoxide in low temperature ranges. The catalyst consists of vanadium compounds and metals of the platinum group, which are applied on aluminum oxide, titanium oxide, silicon oxide, zeolite as well as mixtures thereof. According to Tables 2 and 3 of these documents, the values for the 50% conversion of CO and HC ($T_{50}$ values which are also termed as light-off temperature) for the freshly prepared catalysts are above 200° C.

U.S. Pat. No. 7,078,004 discloses a method for treating diesel exhaust gas stream whereby the stream is contacted with an upstream catalyst comprising a cerium component and/or a zeolite component and a particulate filter located downstream from the upstream catalyst. The framework alumina of the zeolite component can be substituted by at least one metal selected from the group B, Ga, In, Fe, Cr, V, As. The exchangeable cationic component of the zeolite can be selected from the group consisting of hydrogen and at least one metal selected from the group consisting of $Li_1$, Na, K, Rb, Cs, Mg, $Ca_1$ Sr, $Ba_1$ Cr, $Mn_1$ Fe, Co, Ni, Cu, Nb, Ma, Ta, W, Re, Pt, Pd and Rh.

U.S. Pat. No. 6,093,378 discloses a catalyst composition and structure containing the same and methods for treating diesel exhaust including a catalyst comprising a precious metal on a support, a first zeolite component in the presence of a precious metal and a second zeolite component comprising a zeolite and a precious metal, and a non-catalytic pore-containing zeolite.

US 2013/0202509 relates to a catalytically active material consisting of an inner core (1) and an outer shell (2) surrounding this core, the core being formed from palladium and gold fixed together on a first support oxide, and the shell comprising platinum fixed on a second support oxide, to a diesel oxidation catalyst comprising this catalytically active material, and to an exhaust gas cleaning system comprising this diesel oxidation catalyst.

US 2011/0044871 relates to a coating composition for diesel oxidation catalysts or a combination of diesel oxidation catalysts and diesel particle filters, said coating composition comprising a combination of a noble metal on a metal oxide, with the exception of cerium oxide, and a zeolite doped with iron. The invention also relates to a catalyst provided with the coating and to a method for treating the exhaust gas of diesel internal combustion engines.

U.S. Pat. No. 5,491,120 discloses oxidation catalysts containing ceria and a bulk second metal oxide which may be one or more of titania, Zirconia, ceria-Zirconia, silica, alumina silica and alpha-alumina.

Considering the higher cost of noble metal based catalysts and its deactivation due to sulfur poisoning or sintering effects, development of a non noble metal based catalyst for oxidation of hydrocarbons and CO is highly desired.

OBJECTIVES OF THE INVENTION

An object of the present invention is to provide a non noble metal based diesel oxidation catalyst.

Another objective of the present invention is to provide a process for the synthesis of the non-noble metal based diesel oxidation catalyst.

Yet another objective of the present invention is to provide a non noble metal based catalysts for oxidation of hydrocarbon and carbon monooxide (CO) at low temperature.

Yet another objective of the present invention is to provide a non-noble metal based catalyst with sulfur tolerance and water resistance.

SUMMARY OF THE INVENTION

Accordingly, the present invention provides a diesel oxidation catalyst comprising a mixed oxide of A and B, wherein A is Mn and B is Ce or a mixture of Ce and Zr, said catalyst comprises A in the range of 1-60% by weight of the catalyst and B in the range of 40-99% by weight of the catalyst, wherein the catalyst is devoid of noble-metal and is having Mn particle size of 50-70% particles <1 nm;

said catalyst is prepared by a process comprising:
a) mixing salt of A and salt of B in water or a mixture of water and an acid to obtain a solution;
b) adjusting pH of the solution obtained in step (a) in the range of 7-12;
c) heat treating the solution of (b) to a temperature in the range of 100-200° C. for 15-120 minutes to obtain a reaction mixture;
d) cooling and filtering the reaction mixture to obtain a residue; and
e) washing and calcinating the residue obtained in step (d) at a temperature in the range of 300-800° C. for 1-5 hours to obtain the diesel oxidation catalyst.

In one embodiment of the invention the BET surface area of the catalysts is 100-160 $m^2/g$ with a pore volume of 0.200 to 0.381 $cm^3/g$.

In an embodiment of the invention the salt of A and B is selected from the group consisting of nitrate, acetate.

In another embodiment of the invention the acid used is nitric acid.

In another embodiment of the invention the catalyst according to claim 1 is useful in oxidation of hydrocarbons and carbon monoxide from diesel engine exhaust.

Still in another embodiment of the invention the catalyst oxidizes carbon monoxide (50% conversion) at a temperature in the range of 30 to 250° C.

Still in another embodiment of the invention the catalyst exhibits sulphur tolerance with oxidation of carbon monooxide (50% conversion) at a temperature in the range of 200 to 300° C.

Still in another embodiment of the invention the catalyst exhibits water tolerance with oxidation of carbon monooxide (50% conversion) at a temperature in the range of 220 to 300° C.

DETAILED DESCRIPTION OF THE INVENTION

The invention will now be described in detail in connection with certain preferred and optional embodiments, so that various aspects thereof may be more fully understood and appreciated.

The present invention provides a diesel oxidation catalyst comprising a mixed oxide of A and B, wherein A is Mn and B is Ce or a mixture of Ce and Zr, said catalyst comprises A in the range of 1-60% by weight of the catalyst and B in the range of 40-99% by weight of the catalyst, wherein the catalyst is devoid of noble-metal and is having Mn particle size of 50-70% particles <1 nm; said catalyst is prepared by a process comprising:

a) mixing salt of A and salt of B in water or a mixture of water and an acid to obtain a solution;

b) adjusting pH of the solution obtained in step (a) in the range of 7-12;

c) heat treating the solution of (b) to a temperature in the range of 100-200° C. for 15-120 minutes to obtain a reaction mixture;

d) cooling and filtering the reaction mixture to obtain a residue; and e) washing and calcining the residue obtained in step (d) at a temperature in the range of 300-800° C. for 1-5 hours to obtain the diesel oxidation catalyst.

The diesel oxidation catalyst is prepared by modified co-precipitation method and hydrothermal treatment with different molar ratios of salts of A and B.

The BET surface area of the diesel oxidation catalysts is >150 m$^2$/g with a pore volume of 0.381 cm$^3$/g for $Mn_{0.5}Ce_{0.5}O_2$.

The catalyst was tested for diesel oxidation using propene, carbon monoxide as model compounds of diesel exhaust and sulphur tolerance and its activity was compared with 1 wt % $Pt/Al_2O_3$ as reference catalyst.

In another embodiment of the present invention, the catalyst oxidizes carbon monoxide (50% conversion) at temperature in the range of 30 to 250° C.

The diesel oxidation of the catalyst is studied by estimating propene and CO oxidation in a quartz tubular reactor. The detailed protocol is provided in example 9.

In another aspect, the Mn—Ce catalyst shows lower light off temperature compared to $Pt/Al_2O_3$ and shows 100% conversion at 200° C. for propene and 120° C. for CO which is comparable with that of $Pt/Al_2O_3$.

Figure 2:
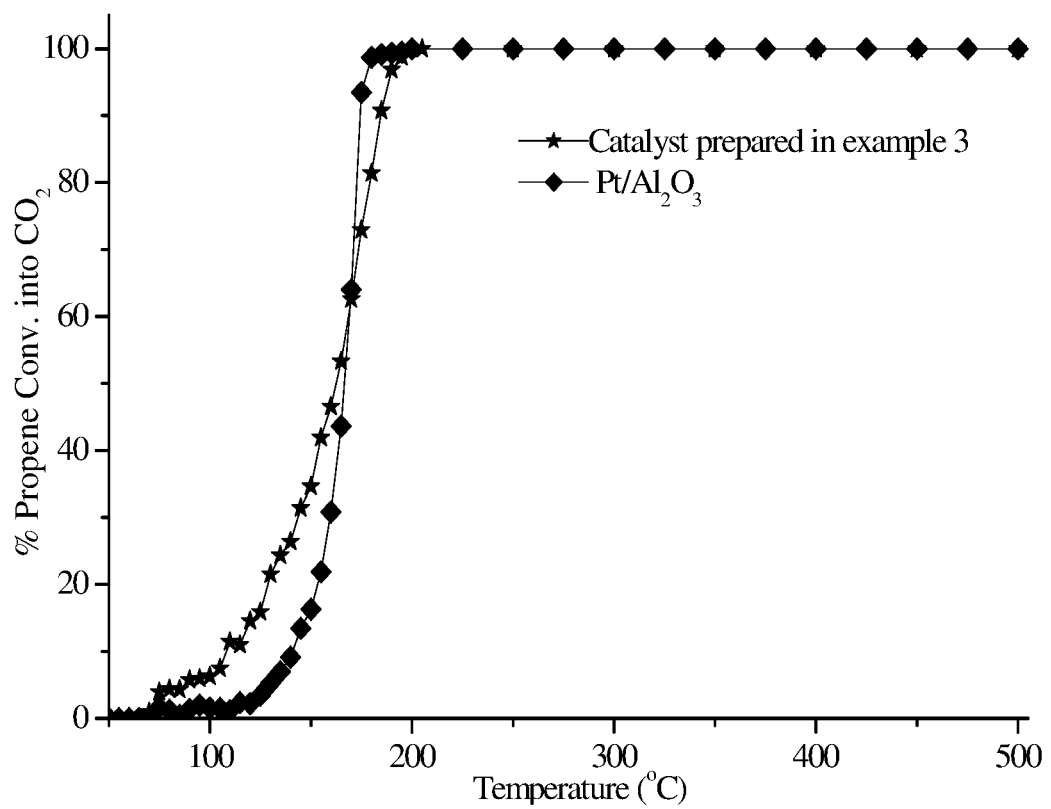
FIG. 2: depicts the diesel (propene) oxidation activity of the catalysts in comparison to Pt catalyst.

With reference to FIG. 2, diesel oxidation activity of the catalyst prepared in Example 3 shows 100% propene conversion at 300° C. in presence of water, exhibiting the water tolerance of the catalyst of the present invention.

Figure 6:
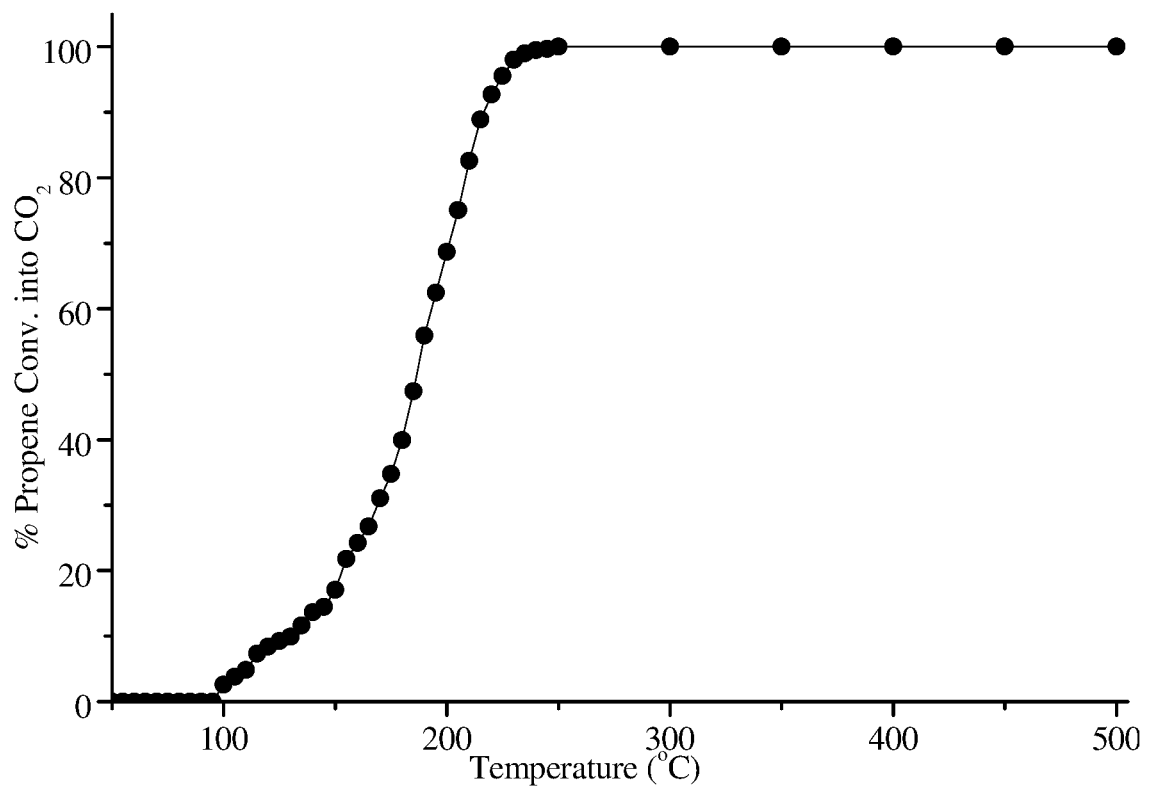
FIG. 6: Sulfur tolerance of catalyst prepared in Example 3.

The present invention, the diesel oxidation activity of catalyst shoes 100% propene conversion at 200 to 300° C. in presence of $SO_2$, referring to FIG. 6.

Figure 7:
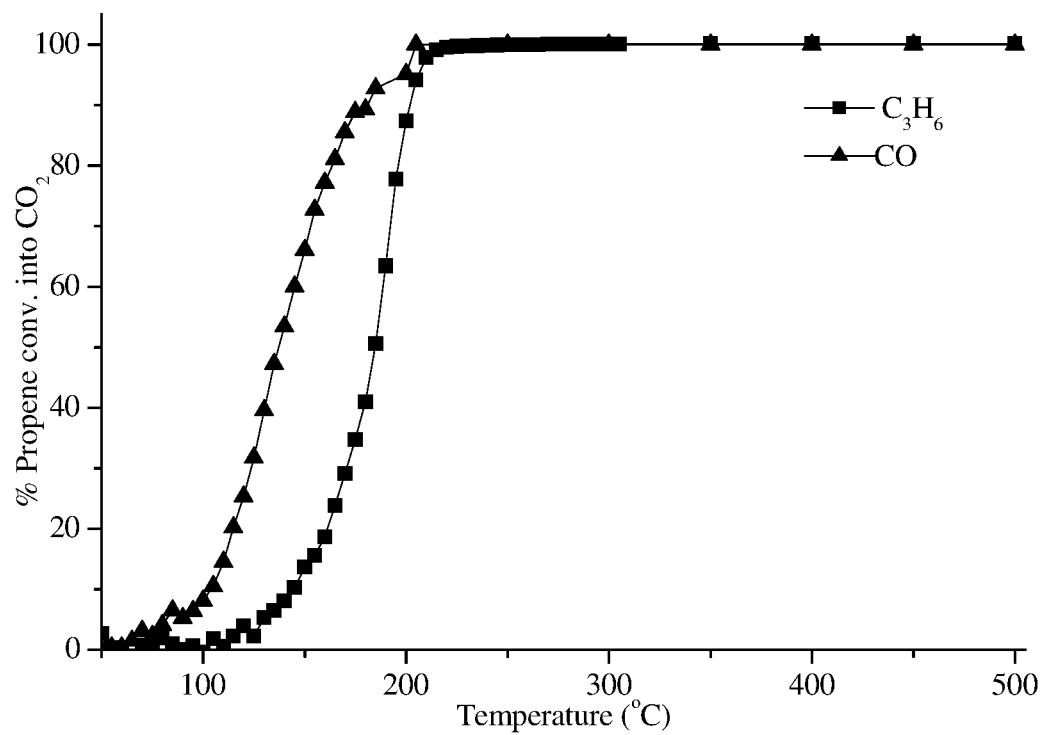
FIG. 7: Oxidation activity (Propene+CO) of the catalyst prepared in Example 3

The present invention, the oxidation activity of catalyst shows 100% propene conversion at 220 to 300° C. at higher gas velocities (50000 h$^{-1}$), referring to FIG. 7.

EXAMPLE

The following examples are given by way of illustration of the working if the invention is actual practice and shall not be construed to limit the scope of the present invention in anyway.

Example 1

Ce(NO$_3$)$_3$:6H$_2$O (12.623 g) and 0.798 g of Mn(OAc)$_2$:4H$_2$O were dissolved in 80 mL deionized water. To this solution, NH$_4$OH (10% v/v in water) solution was added dropwise with constant stirring till pH 10 was obtained. The mixture was stirred additionally for 24 h at room temperature. The mixture was then transferred to 300 mL teflon-lined stainless steel autoclave and kept static at 120° C. for 40 min and cooled to room temperature. The final reaction mixture was filtered and washed with water. The final residue was dried at room temperature followed by drying at 80° C. for 12 h. Then it was calcined at 500° C. for 5 h at the rate of 2° C. min$^{-1}$.

Example 2

Ce(NO$_3$)$_3$:6H$_2$O (12.623 g) and 3.054 g of Mn(OAc)$_2$:4H$_2$O were dissolved in 80 mL deionized water. To this solution, NH$_4$OH (10% v/v in water) solution was added dropwise with constant stirring till pH 10 was obtained. The mixture was stirred for additionally 24 h at room temperature. The mixture was transferred to 300 mL teflon-lined stainless steel autoclave and kept static at 120° C. for 40 min and cooled to room temperature. The final reaction mixture was filtered and washed with water. The final residue was dried at room temperature followed by drying at 80° C. for 12 h. Then it was calcined at 500° C. for 5 h at the rate of 2° C. min$^{-1}$.

Example 3

12.623 g Ce(NO$_3$)$_3$: 6H$_2$O and 7.126 g of Mn(OAc)$_2$:4H$_2$O was dissolved in 80 mL deionized water. To this solution NH$_4$OH (10% v/v in water) solution was added dropwise with constant stirring till pH 10. The mixture was stirred for additionally 24 h at room temperature. The mixture was transferred to 300 mL teflon-lined stainless steel autoclave and kept static at 120° C. for 40 min and cooled to room temperature. The final reaction mixture was filtered and washed with water. The final residue was dried at room temperature followed by drying at 80° C. for 12 h. Then it was calcined at 500° C. for 5 h at the rate of 2° C. min$^{-1}$.

Example 4

Figure 1:
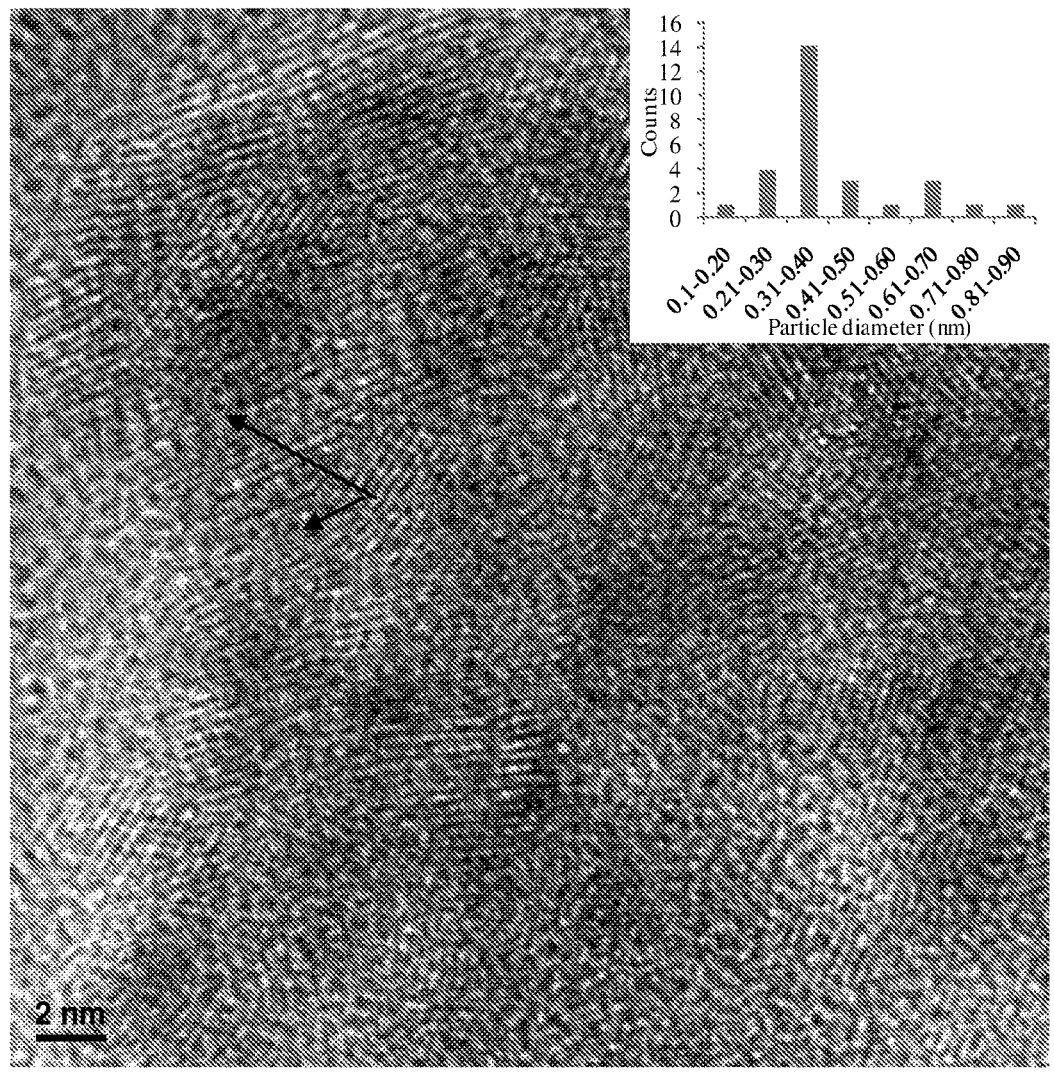
FIG. 1: TEM images of catalyst prepared in Example 3.

The catalyst prepared in Example 3 was characterized by HR-TEM using Tecnai FEI G2 microscope, using an accelerating voltage of 300 kV. For TEM analysis, a sample was dispersed in isopropanol by an ultrasonic bath and deposited on a coated 200 mesh Cu grid. The results are shown in FIG. 1. The TEM analysis showed that majority of manganese particles (50-70%) are <1 nm size.

Example 5

Ce(NO$_3$)$_3$:6H$_2$O (30.563 g), Zr(NO$_3$):6H$_2$O (7.957 g) and Mn(OAc)$_2$:4H$_2$O (9.970) was dissolved in 300 mL deionized water and 14 mL conc. HNO$_3$ acid. To this NH$_4$OH (10% v/v in water) solution was added dropwise with constant stirring till pH 10. The mixture was stirred additionally for 24 h at room temperature. The mixture was transferred to 300 mL teflon-lined stainless steel autoclave and kept at 120° C. for 40 min and cooled to room temperature. The final reaction mixture was filtered and washed with water. The final residue was dried at room temperature followed by drying at 80° C. for overnight. Then it was calcined at 500° C. for 5 h at the rate of 2° C. min$^{-1}$.

Example 6

Ce(NO$_3$)$_3$:6H$_2$O (20.156 g), Zr(NO$_3$):6H$_2$O (5.297 g) and Mn(OAc)$_2$:4H$_2$O (6.571 g) was dissolved in 120 mL deionized water and 5 mL Conc. HNO$_3$ acid. To this solution NH$_3$OH (10% v/v in water) solution was added dropwise with constant stirring till pH 10. The mixture was stirred additionally for 24 h at room temperature. The final reaction mixture was filtered and washed with water. The final residue was dried at room temperature followed by drying at 80° C. for overnight. Then precipitate was calcined at 500° C. for 5 h at the rate of 2° C. min$^{-1}$.

Example 7

Ce(NO$_3$)$_3$:6H$_2$O (10.193 g), Zr(NO$_3$):6H$_2$O (2.676 g) was dissolved in 120 mL deionized water and 7 mL Conc. HNO$_3$ acid. To this solution NH$_4$OH (10% v/v in water) solution was added dropwise with constant stirring till pH 10. The mixture was stirred additionally for 24 h at room temperature. The final reaction mixture was filtered and washed with water. The final residue was dried at room temperature and followed by drying at 80° C. for overnight. Then precipitate was calcined at 500° C. for 5 h at the rate of 2° C. min$^{-1}$. To this calcined material 200 ml deionised water was added to form slurry. To this slurry Mn(OAc)$_2$:4H$_2$O (5.329 g) in 30 mL deionized water was added. To this solution NH$_4$OH (10% v/v in water) solution was added dropwise with constant stirring till pH 10. The mixture was stirred additionally for 24 h at room temperature. The final reaction mixture was filtered and washed with water. The final residue was dried at room temperature followed by drying at 80° C. for overnight. Then precipitate was calcined at 500° C. for 5 h at the rate of 2° C. min'.

Example 8

The manganese content in the catalyst was estimated by ICP-AES using Spectra Arcos instrument. ~20 mg sample was dissolved in 10 mL aqua regia by an ultrasonic bath and diluted to 100 mL after digestion on hot plate at 80° C. The results are shown below:

| Catalysts prepared in Example | Mn wt. % By ICP-AES |
| --- | --- |
| 1 | 3.917 |
| 2 | 13.358 |
| 3 | 24.314 |

Example 9

The diesel oxidation activity of the catalyst prepared in Example 3 was tested in down flow reactor. Reaction was carried out in a quartz tubular reactor (inner diameter 4 mm) at atmospheric pressure. The catalyst (0.5 g) was diluted with commercial silica gel of 60-120 mesh (2 g) and loaded in the quartz reactor. The reactor was heated with the help of electrically heated furnace. Initially catalyst was heated at 500° C. for 1 h in flow of 10% O$_2$ in He and then reactor was cooled to 50° C. The reaction was carried out by passing 300 ppm propene+5% O$_2$, and He gas as a balance. The total flow of the gases was controlled by mass flow controllers to get desired gas hourly space velocity of 20,000 h$^{-1}$. The concentrations of the inlet and outlet gases were simultaneously monitored using Micro GC (Agilent 3000 A), fitted with molecular sieves to detect different gases (MS 5 A, for O$_2$, CO), quadrupole mass spectrometer (Hiden, HPR 20) for CO$_2$ (44), CO (29), C$_3$H$_6$ (41). The activity was compared with 1% Pt/Al$_2$O$_3$ (commercial composition prepared in house by impregnating aqueous solution of platinum chloride on γ-Al$_2$O$_3$) under identical reaction conditions and the results are given in FIG. 2. The figure shows that the (propene) oxidation activity of catalyst prepared in example 3 is comparable with Pt/Al$_2$O$_3$ with better low temperature activity compared to Pt/Al$_2$O$_3$ and almost comparable temperature for 100% propene conversion.

Example 10

Figure 3:
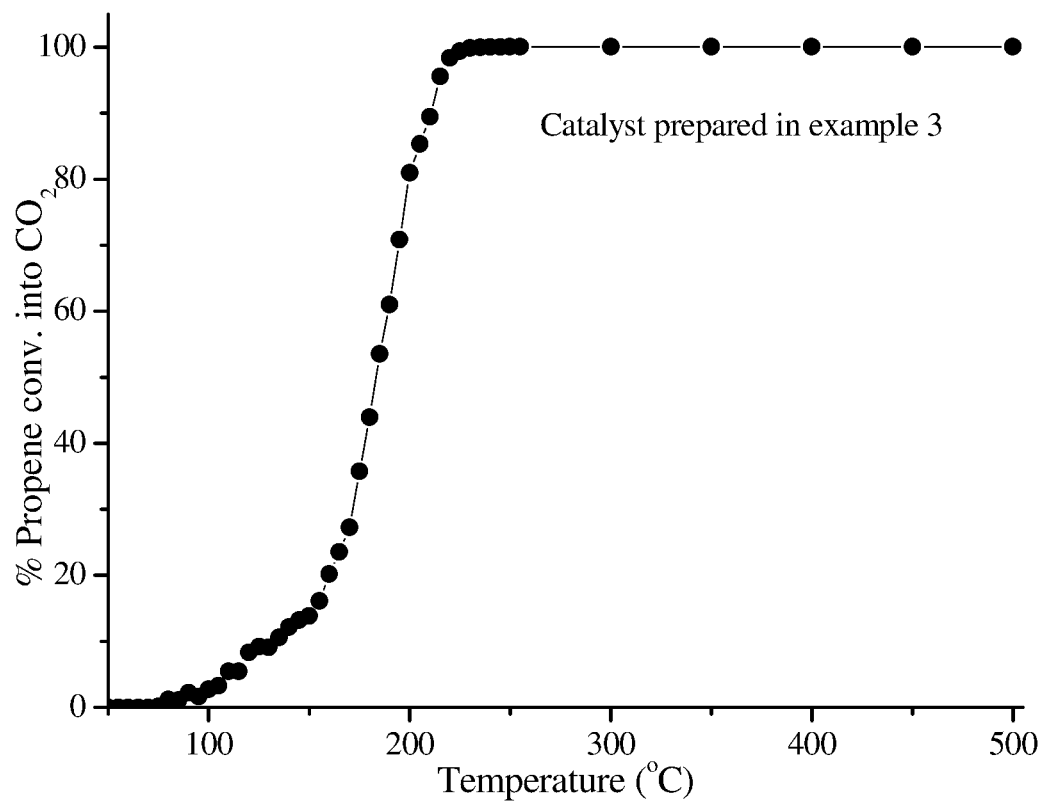
FIG. 3: depicts diesel oxidation (propene) activity at 50000 $h^{-1}$ GHSV

The diesel oxidation activity of the catalyst prepared in Example 3 was tested in down flow reactor. Reaction was carried out in a quartz tubular reactor (inner diameter 4 mm) at atmospheric pressure. Catalyst (0.5 g) was diluted with commercial silica gel of 60-120 mesh (2 g) and loaded in the quartz reactor. The reactor was heated with the help of electrically heated furnace. Initially catalyst was heated at 500° C. for 1 h in flow of 10% O$_2$ in He and then reactor was cooled to 50° C. The reaction was carried out by passing 300 ppm propene+5% O$_2$, and He gas as a balance. The total flow of the gases was controlled by mass flow controllers to get desired gas hourly space velocity of 50,000 h$^{-1}$. The concentrations of the inlet and outlet gases were simultaneously monitored using Micro GC (Agilent 3000 A), fitted with molecular sieves to detect different gases (MS 5 A, for O$_2$, CO), quadrupole mass spectrometer (Hiden, HPR 20) for CO$_2$ (44), CO (29), C$_3$H$_6$ (41). The results of the activity are given in FIG. 3. Diesel oxidation activity of catalyst prepared in example 3 showed 100% propene conversion at 230° C.

Example 11

Figure 4:
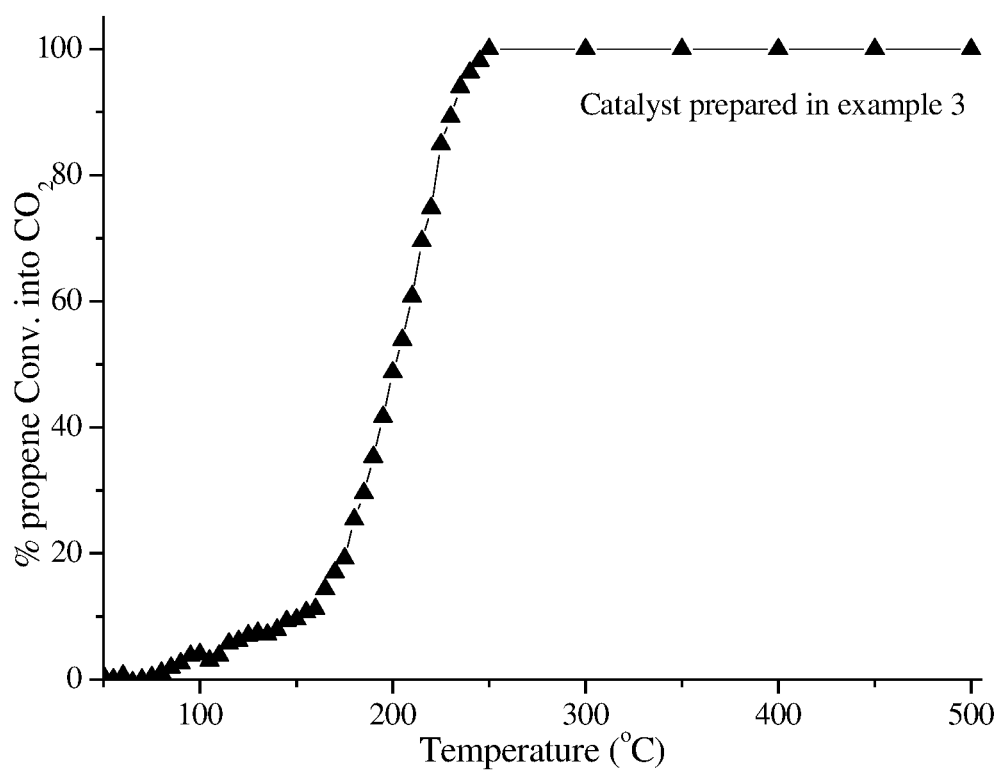
FIG. 4: Diesel oxidation (propene) activity at 100000 $h^{-1}$ GHSV

The diesel oxidation activity of the catalyst prepared in Example 3 was tested in down flow reactor. Reaction was carried out in a quartz tubular reactor (inner diameter 4 mm) at atmospheric pressure. Catalyst (0.5 g) was diluted with commercial silica gel of 60-120 mesh (2 g) and loaded in the quartz reactor. The reactor was heated with the help of electrically heated furnace. Initially catalyst was heated at 500° C. for 1 h in flow of 10% O$_2$ in He and then reactor was cooled to 50° C. The reaction was carried out by passing 300 ppm propene+5% O$_2$, and He gas as a balance. The total flow of the gases was controlled by mass flow controllers to get desired gas hourly space velocity of 1,00000 h$^{-1}$. The concentrations of the inlet and outlet gases were simultaneously monitored using Micro GC (Agilent 3000 A), fitted with molecular sieves to detect different gases (MS 5 A, for O$_2$, CO), quadrupole mass spectrometer (Hiden, HPR 20) for CO$_2$ (44), CO (29), C$_3$H$_6$ (41). The results of the activity are given in FIG. 4. Diesel oxidation activity of catalyst prepared in Example 3 showed 100% propene conversion at 250° C.

Example 12

Figure 5:
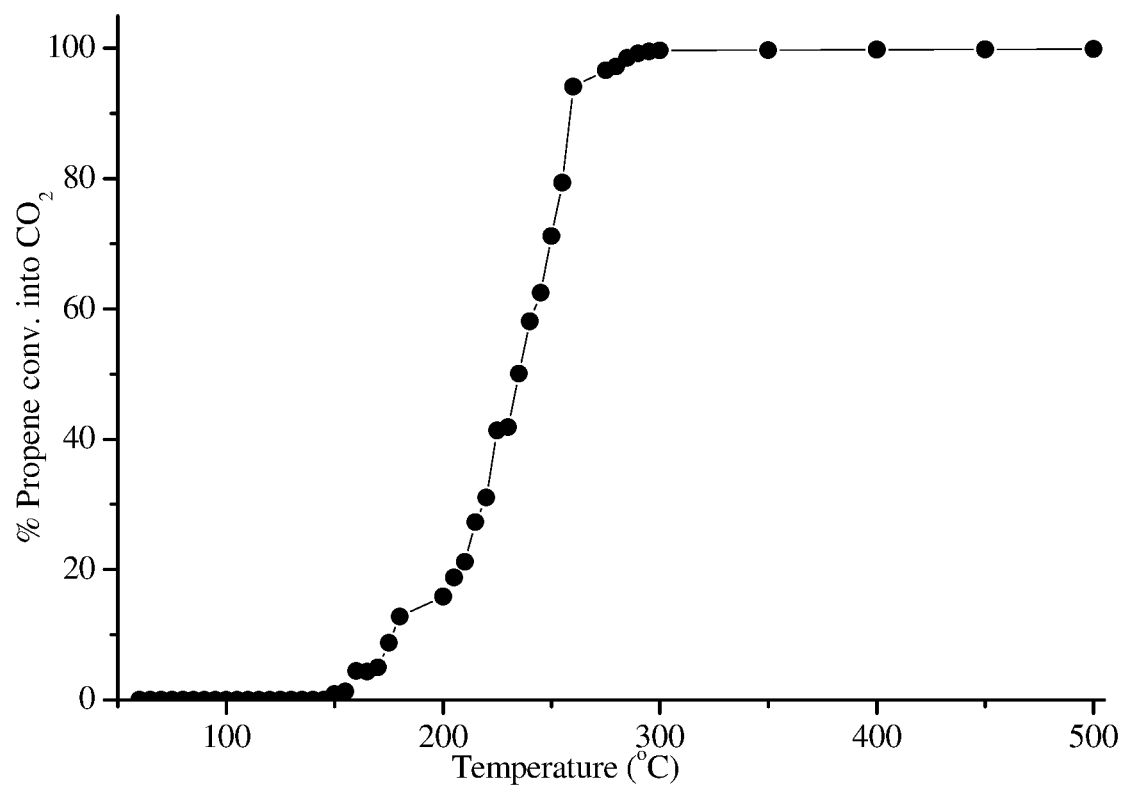
FIG. 5: Water tolerance of catalyst prepared in Example 3 (propene)

The diesel oxidation activity of the catalyst prepared in Example 3 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 300 ppm propene+5% $O_2$+9% $H_2O$ and He gas as a balance. Water was supplied to the reactor by peristaltic pump (Tris ISCO) through a preheated evaporator to generate steam. The total flow of the gases was controlled by mass flow controllers to get desire gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $CO_2$ (44), CO (29), $C_3H_6$ (41), $O_2$ (32). The results of the activity are given in FIG. 5. Diesel oxidation activity of catalyst prepared in example 3 showed 100% propene conversion at 300° C. in presence of water.

Example 13

The diesel oxidation activity of the prepared catalyst in Example 3 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 300 ppm propene+5% $O_2$+10 ppm $SO_2$ and He gas as a balance. The total flow of the gases was controlled by mass flow controllers to get desire gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $O_2$ (32) $CO_2$ (44), CO (29), $C_3H_6$ (41). The results of the activity are given in FIG. 6. Diesel oxidation activity of catalyst prepared in Example 3 showed 100% propene conversion at 250° C. in presence of $SO_2$.

Example 14

The diesel oxidation activity of the catalyst prepared in Example 3 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially, the catalyst was heated at 500° C. for 1 h in flow of 10% $O_2$ in He and then reactor was cooled to 50° C. The reaction was carried out by passing 300 ppm propene+300 ppm CO+10% $O_2$+10% $CO_2$ and He gas as a balance. The total flow of the gases was controlled by mass flow controllers to get desire gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $CO_2$ (44), CO (29), $C_3H_6$ (41), $O_2$ (32). The results of the activity are given in FIG. 7. Oxidation activity of catalyst prepared in Example 3 showed 100% propene conversion at 220° C. and 100% CO conversion at 205° C.

Example 15

Figure 8:
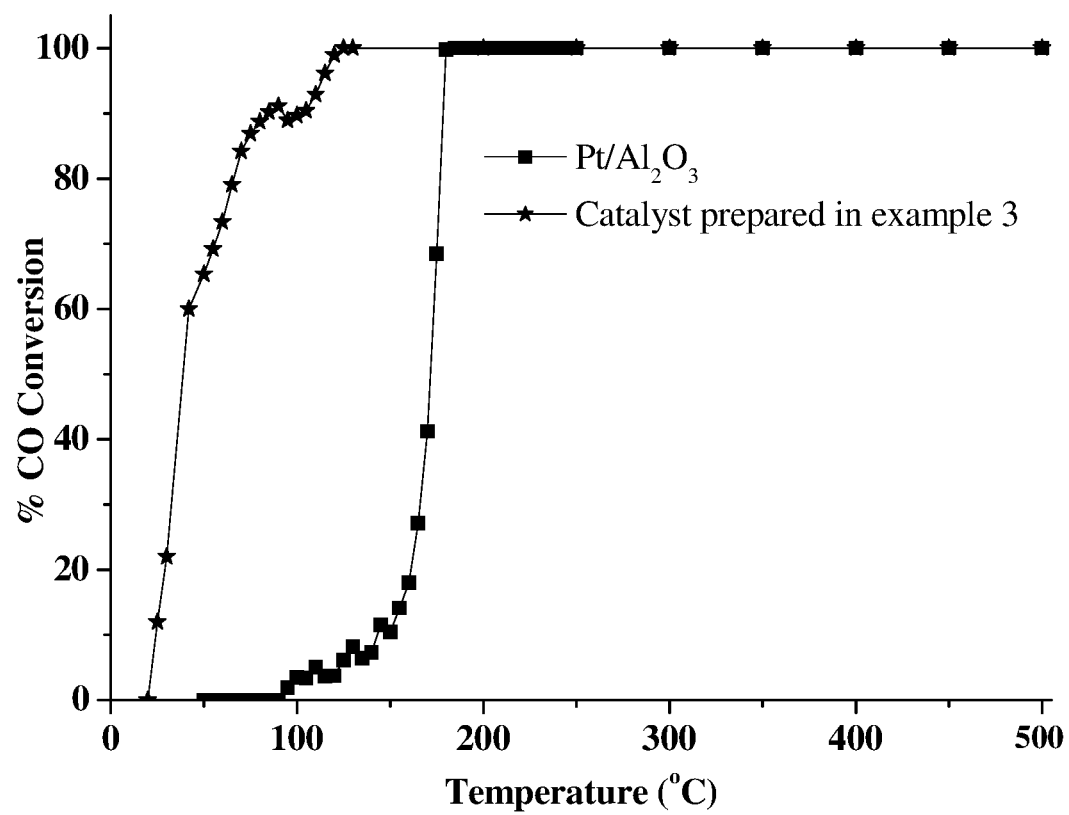
FIG. 8: Depicts the (CO) diesel oxidation activity of the catalysts in comparison to Pt catalyst.

The diesel oxidation activity of the catalyst prepared in Example 3 was tested in down flow reactor. Typically reaction was carried out in a quartz tubular reactor (inner 15. diameter 4 mm) at atmospheric pressure. Catalyst (0.5 g) was diluted with commercial silica gel of 60-120 mesh (2 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 1000 ppm CO+5% $O_2$, and He gas as a balance. The total flow of the gases was controlled by mass flow controllers to get desired gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $CO_2$ (44), CO (29). The results of the activity are given in FIG. 8. Oxidation activity of catalyst prepared in Example 3 showed 100% CO conversion at 125° C.

Example 16

Figure 9:
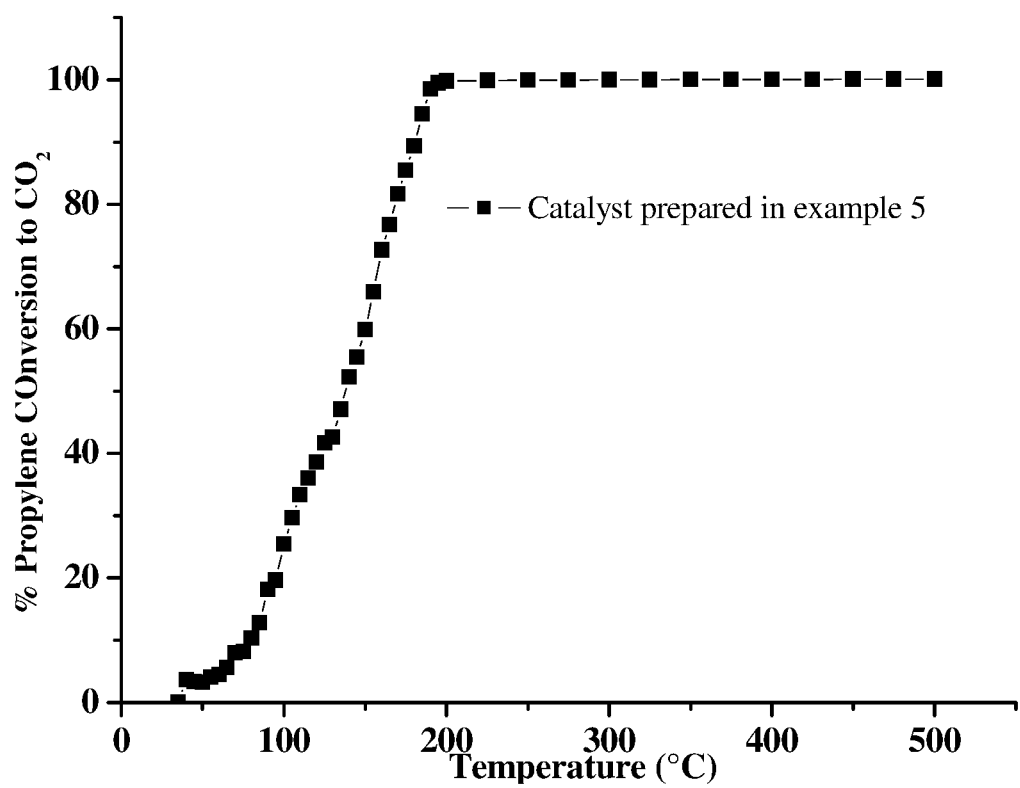
FIG. 9: Diesel oxidation activity (Propene) of catalyst prepared in Example 5

The diesel oxidation activity of the catalyst prepared in Example 5 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2 g) and loaded in the quartz reactor. The reactor was heated with the help of electrically heated furnace. Initially catalyst was heated at 500° C. for 1 h in flow of 10% $O_2$ in He and then reactor was cooled to 25° C. The reaction was carried out by passing 300 ppm propene+5% $O_2$, and He gas as a balance. The total flow of the gases was controlled by mass flow controllers to get desired gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $CO_2$ (44), CO (29), $C_3H_6$ (41). The results of the activity are given in FIG. 9. Diesel oxidation activity of catalyst prepared in Example 5 showed 100% propene conversion at 195° C.

Example 17

The diesel oxidation activity of the catalyst prepared in Example 5 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 300 ppm propene+5% $O_2$+10 ppm $SO_2$ and He gas as a balance. The total flow of the gases was controlled by mass flow controllers to get desire gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $O_2$ (32) $CO_2$ (44), CO (29), $SO_2$ (64), $C_3H_6$ (41).

Figure 10:
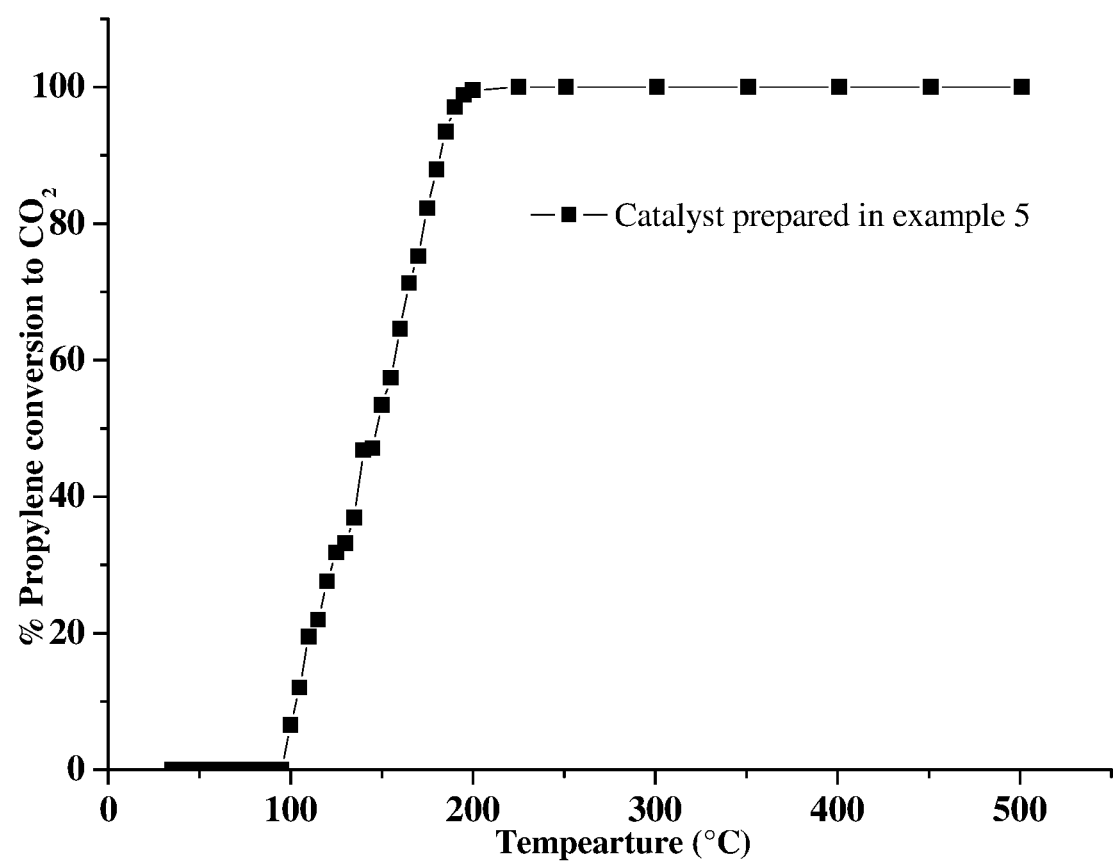
FIG. 10: Sulfur tolerance (Propene) of catalyst prepared in Example 5.

Diesel oxidation activity of catalyst prepared in example 5 showed 100% propene conversion at 200° C. in presence of $SO_2$. The results of the activity are given in FIG. 10. Diesel oxidation activity of catalyst prepared in example 5 showed 100% propene conversion at 200° C. in presence of $SO_2$.

Example 18

Figure 11:
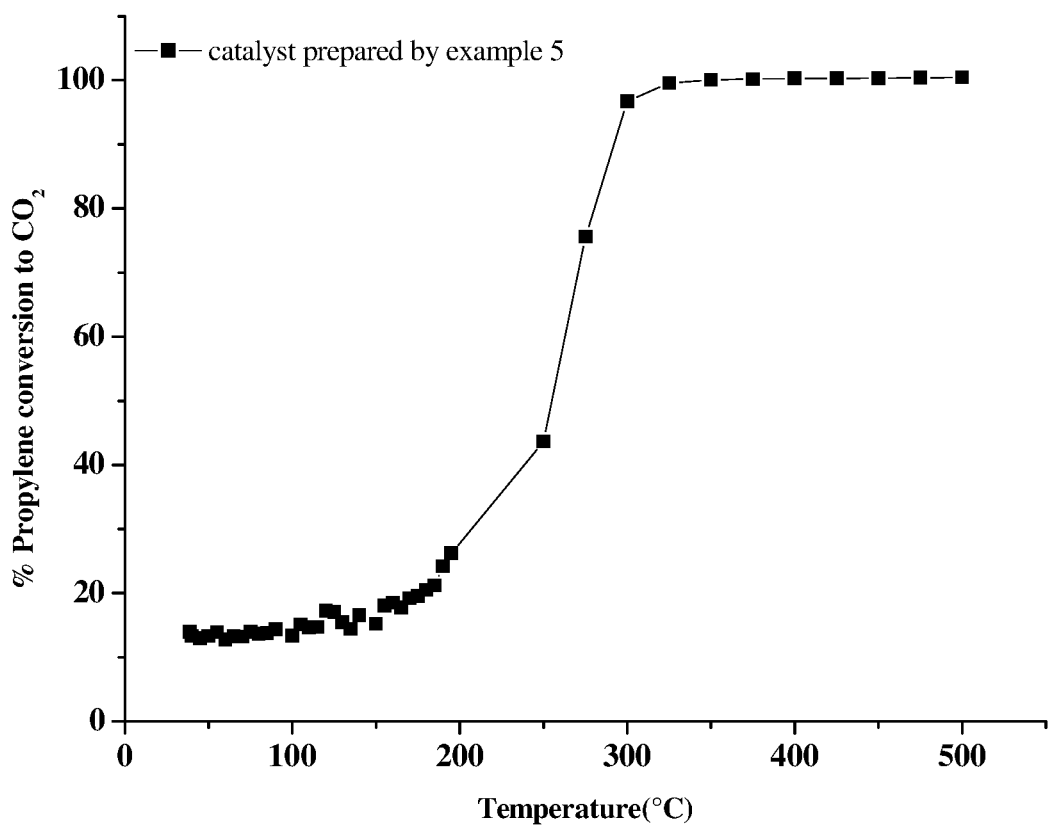
FIG. 11: Water tolerance of (Propene) catalyst prepared in Example 5.

The diesel oxidation activity of the catalyst prepared in Example 5 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 300 ppm propene+5% $O_2$+9% $H_2O$ and He gas as a balance. The total flow of the gases was controlled by mass flow controllers to get desire gas hourly space velocity of 20,0001 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $O_2$ (32) $CO_2$ (44), CO (29), $C_3H_6$ (41). The results of the activity are given in FIG. 11. Diesel oxidation activity of catalyst prepared in example 5 showed 100% propene conversion at 325° C. in presence of $H_2O$.

Example 19

Figure 12:
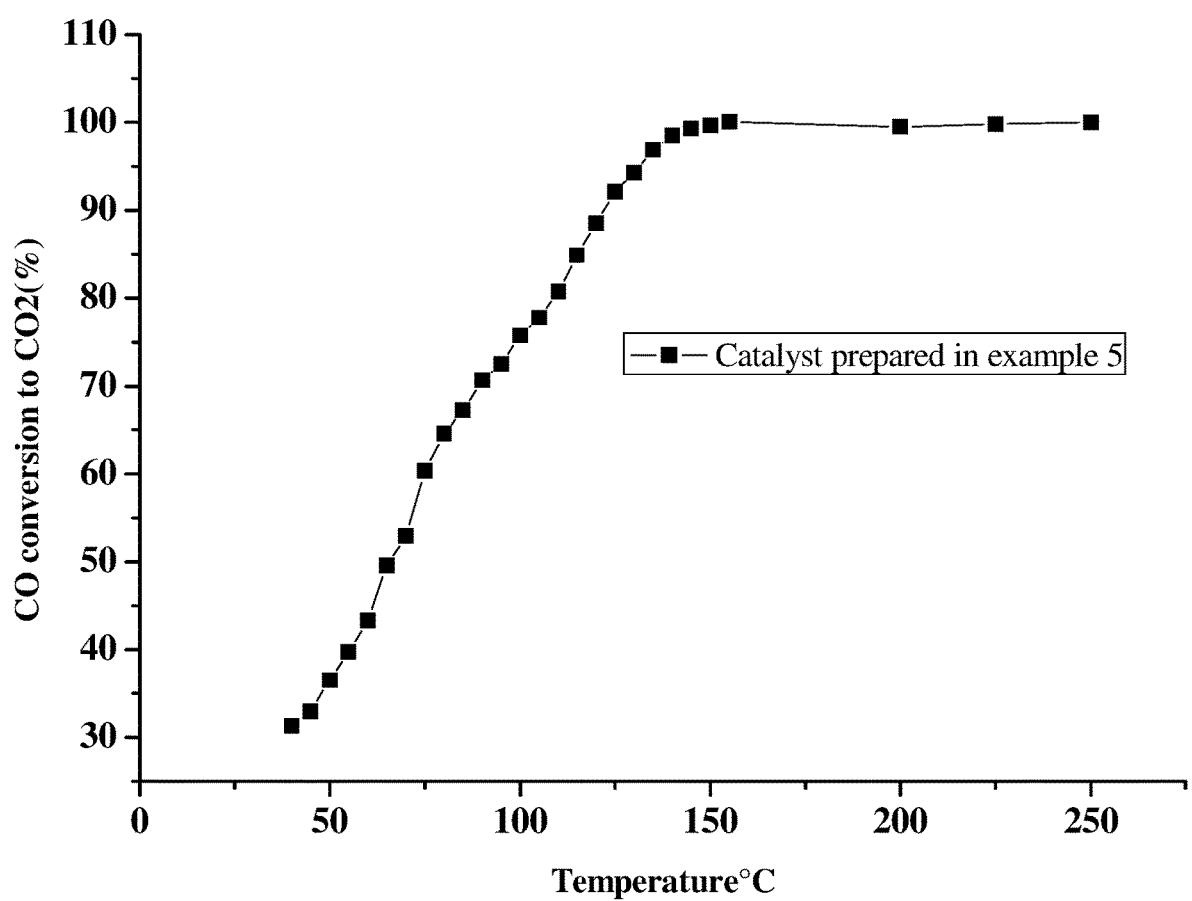
FIG. 12: Diesel oxidation activity (CO) of catalyst prepared in Example 5

The diesel oxidation activity of the catalyst prepared in Example 5 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 1000 ppm CO+5% $O_2$ and He gas as a balance. The total flow of the gases was controlled by mass flow controllers to get desire gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $O_2$ (32) $CO_2$ (44), CO (29). The results of the activity are given in FIG. 12. Diesel oxidation activity of catalyst prepared in example 5 showed 100% CO conversion at 145° C.

Example 20

Figure 13:
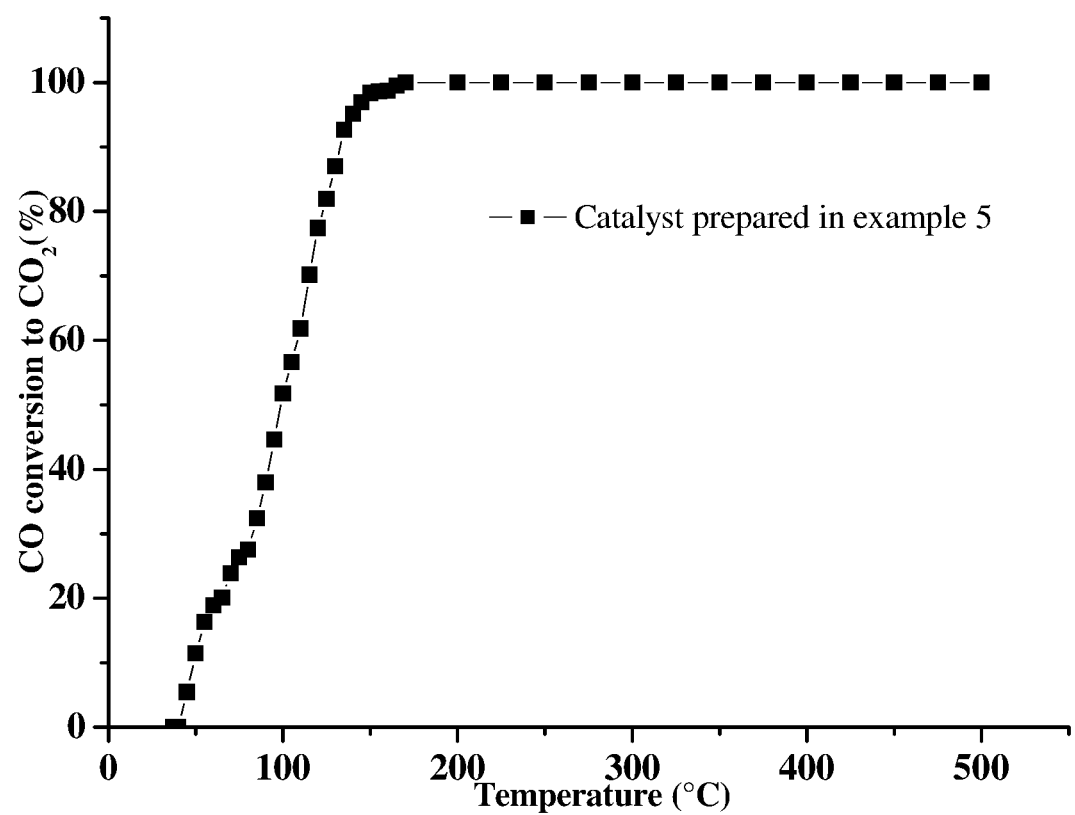
FIG. 13: Sulfur tolerance of catalyst (CO) prepared in Example 5.

The diesel oxidation activity of the catalyst prepared in Example 5 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 1000 ppm CO+5% $O_2$+10 ppm $SO_2$ and He gas as a balance. The total flow of the gases was controlled by mass flow controllers to get desire gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $O_2$ (32) $CO_2$ (44), CO (29), $SO_2$ (64). The results of the activity are given in FIG. 13. Diesel oxidation activity of catalyst prepared in example 5 showed 100% CO conversion at 165° C. in presence of $SO_2$.

Example 21

Figure 14:
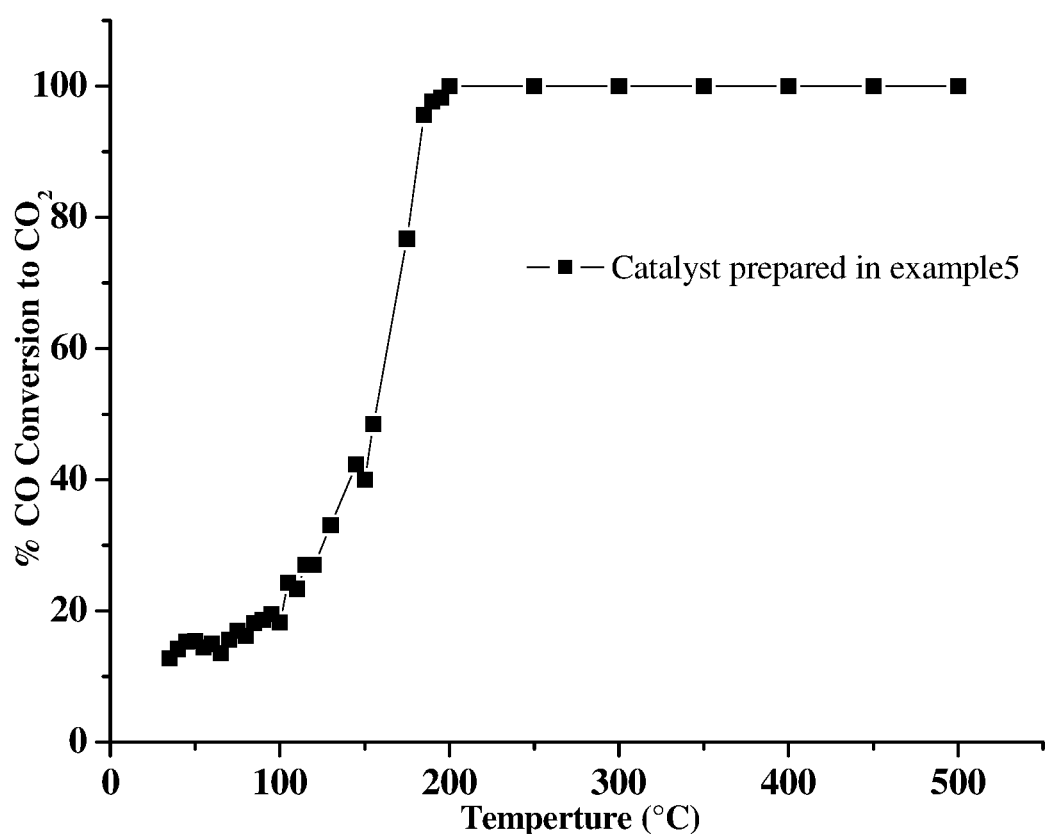
FIG. 14: Water tolerance of catalyst (CO) prepared in Example 5.

The diesel oxidation activity of the catalyst prepared in example 5 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 1000 ppm CO+5% $O_2$+9% $H_2O$ and He gas as a balance. The total flow of the gases was controlled by mass flow controllers to get desire gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $O_2$ (32) $CO_2$ (44), CO (29). The results of the activity are given in FIG. 14. Diesel oxidation activity of catalyst prepared in example 5 showed 100% CO conversion at 200° C. in presence of $H_2O$.

Example 22

Figure 15:
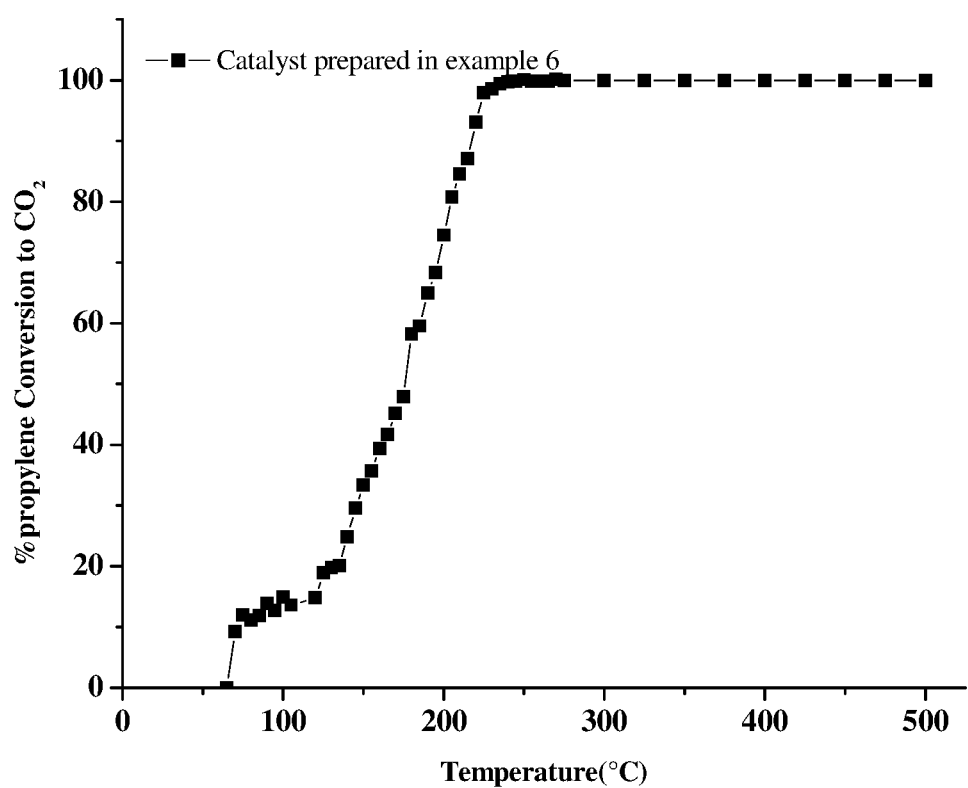
FIG. 15: Diesel oxidation activity (CO) of catalyst prepared in Example 6

The diesel oxidation activity of the catalyst prepared in Example 6 was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 1000 ppm CO+5% $O_2$ and He gas as a balance. The total flow of the gases was controlled by mass flow controllers to get desire gas hourly space velocity of 20,000 The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $O_2$ (32) $CO_2$ (44), CO (29). The results of the activity are given in FIG. 15. Diesel oxidation activity of catalyst prepared in example 6 showed 100% CO conversion at 235° C.

Example 23

Figure 16:
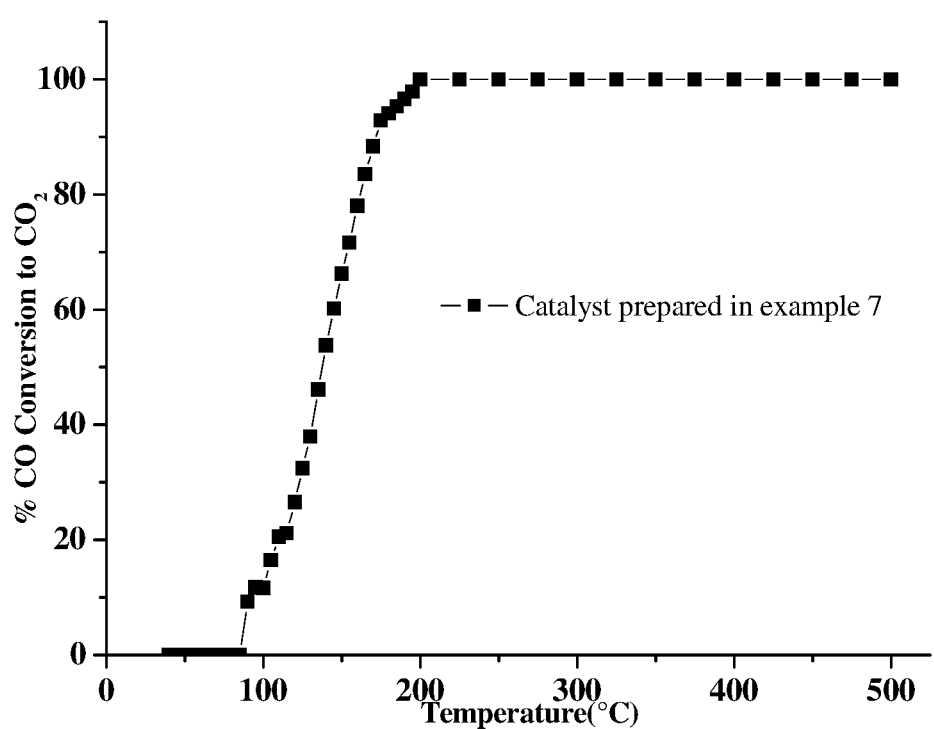
FIG. 16: Diesel oxidation activity (CO) of catalyst prepared in Example 7

The diesel oxidation activity of the catalyst in example 7 catalyst was tested in down flow reactor. Typically reaction was carried out in a quartz tubular reactor (inner diameter 4 mm) at atmospheric pressure. Catalyst (0.5 g) was diluted with commercial silica gel of 60-120 mesh (2.0 g) and loaded in the quartz reactor. The reactor was heated with the help of electrically heated furnace. Initially catalyst was heated at 500° C. for 1 h in flow of 10% $O_2$ in He and then reactor was cooled to 50° C. The reaction was carried out by passing 1000 ppm CO+5% $O_2$ and He gas as a balance. The total flow of the gases was controlled by mass flow controllers to get desire gas hourly space velocity of 20,000 $h^{-1}$. The concentrations of the inlet and outlet gases were simultaneously monitored using Micro GC (Agilent 3000 A), fitted with molecular sieves to detect different gases (MS 5 A, for $O_2$, CO), quadrupole mass spectrometer (Hiden, HPR 20) for $O_2$ (32) $CO_2$ (44), CO (29). The results of the activity are given in FIG. 16. Diesel oxidation activity of catalyst prepared in example 7 showed 100% propene conversion at 200° C.

Advantages of Invention

Non noble-metal based catalyst
Easy method of preparation
Oxidation activity comparable with that of $Pt/Al_2O_3$.
Lower light off temperature compared to $Pt/Al_2O_3$
Expected cost will be much cheaper compared to commercial Pt based catalyst (USD 2.2/Kg for Mn).
Catalyst shows good sulphur tolerance
Catalyst shows good water tolerance

We claim:

1. A diesel oxidation catalyst comprising a mixed oxide of A and B, wherein A is Mn and B is Ce or a mixture of Ce and Zr, said catalyst comprises oxide of A in the range of 1-23.314% by weight of the catalyst and oxide of B in the range of 76.686-99% by weight of the catalyst, wherein the catalyst is devoid of noble-metal, and the BET surface area of the catalyst is 150-160 $m^2/g$ with a pore volume of about 0.381 $cm^3/g$;

said catalyst is prepared by a process comprising:
a) mixing salt of A and salt of B in water or a mixture of water and an acid to obtain a solution;
b) adjusting pH of the solution obtained in step (a) in the range of 7-12;
c) heat treating the solution of (b) to a temperature in the range of 100-200° C. for 15-120 minutes to obtain a reaction mixture;
d) cooling and filtering the reaction mixture to obtain a residue; and
e) washing and calcinating the residue obtained in step (d) at a temperature in the range of 300-800° C. for 1-5 hours to obtain the diesel oxidation catalyst.

2. The catalyst according to claim 1, wherein the salt of A and B is selected from the group consisting of nitrate, acetate.

3. The catalyst according to claim 1, wherein the acid used is nitric acid.

4. A method for using a diesel oxidation in oxidation of propene and carbon monoxide or mixture thereof from diesel engine exhaust, said method comprising the steps of:
i) heating said catalyst at 500° C. for 1 hr in flow of 10% $O_2$ in He followed by cooling to a temperature range of 25° C. to 50° C.; and
ii) passing a mixture of carbon monoxide, oxygen and helium gas or a mixture of propene, oxygen and helium gas of said catalyst,
wherein gas hourly space velocity of the mixture of gases is in the range of 20,000 $h^{-1}$ to 100,000 $h^{-1}$;
wherein the catalyst comprises a mixed oxide of A and B, wherein A is Mn and B is Ce or a mixture of Ce and Zr, said catalyst comprises oxide of A in the range of 1-60% by weight of the catalyst and oxide of B in the range of 40-99% by weight of the catalyst, wherein the catalyst is devoid of noble-metal, and the BET surface area of the catalyst is 150-160 $m^2/g$ with a pore volume of about 0.381 $cm^3/g$.

5. The catalyst according to claim 1, wherein the catalyst oxidizes carbon monoxide (50% conversion) at a temperature in the range of 30 to 250° C.

6. The catalyst according to claim 1, wherein the catalyst exhibits sulphur tolerance with oxidation of carbon monoxide (50% conversion) at a temperature in the range of 200 to 300° C.

7. The catalyst according to claim 1, wherein the catalyst exhibits water tolerance with oxidation of carbon monoxide (50% conversion) at a temperature in the range of 220 to 300° C.

* * * * *